US009400567B2

(12) United States Patent
Weir et al.

(10) Patent No.: US 9,400,567 B2
(45) Date of Patent: Jul. 26, 2016

(54) EXPLICIT TOUCH SELECTION AND CURSOR PLACEMENT

(71) Applicant: Microsoft Corporation, Redmond, WA (US)

(72) Inventors: Jeffrey J. Weir, Seattle, WA (US); Jennifer L. Anderson, Kirkland, WA (US); Jennifer Wolfe, Seattle, WA (US); Gerrit H. Hofmeester, Woodinville, WA (US); Jan-Kristian Markiewicz, Redmond, WA (US); Andrew R. Brauninger, Seattle, WA (US); Stuart J. Stuple, Redmond, WA (US); David Earl Washington, Seattle, WA (US); Matthew J. Kotler, Sammamish, WA (US); Ryan Demopoulos, Bellevue, WA (US); Amish Patel, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/683,244

(22) Filed: Nov. 21, 2012

(65) Prior Publication Data

US 2013/0080979 A1   Mar. 28, 2013

Related U.S. Application Data

(63) Continuation of application No. 13/230,524, filed on Sep. 12, 2011.

(51) Int. Cl.
*G06F 3/048* (2013.01)
*G06F 3/033* (2013.01)
(Continued)

(52) U.S. Cl.
CPC ............. *G06F 3/033* (2013.01); *G06F 3/04842* (2013.01); *G06F 3/04883* (2013.01); *G06F 17/24* (2013.01)

(58) Field of Classification Search
CPC ..... G06F 17/24; G06F 3/033; G06F 3/04842; G06F 3/04883; H04M 2250/70
USPC .................... 715/858, 856; 345/173
See application file for complete search history.

(56) References Cited

U.S. PATENT DOCUMENTS 5,040,131 A   8/1991 Torres
5,345,543 A   9/1994 Capps et al.
(Continued)

FOREIGN PATENT DOCUMENTS

CN   101068411 A   11/2007
CN   101910988 A   12/2010
(Continued)

OTHER PUBLICATIONS

"International Search Report", mailed Sep. 27, 2012, Application No. PCT/US2011/055765, filed Oct. 11, 2011, 9 pages.
(Continued)

*Primary Examiner* — Amy Ng
*Assistant Examiner* — William Wong
(74) *Attorney, Agent, or Firm* — Timothy Churna; Sergey Lamansky; Micky Minhas

(57) ABSTRACT

A system and method for implementing an efficient and easy to user interface for a touch screen device. A cursor may be placed by a user using simple inputs. The device operates places the cursor coarsely and refines the cursor placement upon further input from the user. Text may be selected using a gripper associated with the cursor. The user interface allows text selection without occluding the text being selected with the user's finger or the gripper. For selecting text in a multi-line block of text, a dynamic safety zone is implemented to simplify text selection for the user.

20 Claims, 7 Drawing Sheets

(51) Int. Cl.
*G06F 17/24* (2006.01)
*G06F 3/0488* (2013.01)
*G06F 3/0484* (2013.01)

(56) References Cited

U.S. PATENT DOCUMENTS

| | | | |
|---|---|---|---|
| 5,465,325 A | 11/1995 | Capps et al. | |
| 5,513,309 A | 4/1996 | Meier et al. | |
| 5,523,775 A | 6/1996 | Capps | |
| 5,613,019 A * | 3/1997 | Altman et al. | 382/311 |
| 5,649,133 A | 7/1997 | Arquie | |
| 5,710,831 A * | 1/1998 | Beernink et al. | 382/189 |
| 5,778,404 A | 7/1998 | Capps et al. | |
| 6,057,844 A | 5/2000 | Strauss | |
| 6,336,124 B1 | 1/2002 | Alam et al. | |
| 6,344,865 B1 | 2/2002 | Matthews, III et al. | |
| 6,381,593 B1 | 4/2002 | Yano et al. | |
| 6,525,749 B1 | 2/2003 | Moran et al. | |
| 6,587,132 B1 | 7/2003 | Smethers | |
| 6,687,875 B1 | 2/2004 | Suzuki | |
| 7,185,291 B2 | 2/2007 | Wu et al. | |
| 7,574,664 B2 | 8/2009 | Jaeger | |
| 7,617,443 B2 | 11/2009 | Mills et al. | |
| 7,692,629 B2 | 4/2010 | Baudisch et al. | |
| 7,778,821 B2 * | 8/2010 | Mowatt et al. | 704/10 |
| 8,009,146 B2 * | 8/2011 | Pihlaja | 345/173 |
| 8,042,042 B2 | 10/2011 | Kim et al. | |
| 8,091,045 B2 | 1/2012 | Christie et al. | |
| 2002/0067346 A1 * | 6/2002 | Mouton | 345/173 |
| 2002/0097270 A1 | 7/2002 | Keely | |
| 2002/0122197 A1 * | 9/2002 | Abir | 358/1.11 |
| 2004/0056875 A1 | 3/2004 | Jaeger | |
| 2004/0080541 A1 | 4/2004 | Saiga et al. | |
| 2004/0141009 A1 | 7/2004 | Hinckley | |
| 2004/0150664 A1 | 8/2004 | Baudisch | |
| 2005/0083485 A1 | 4/2005 | Toshima et al. | |
| 2005/0193321 A1 * | 9/2005 | Iwema et al. | 715/500 |
| 2005/0198561 A1 | 9/2005 | McAuley | |
| 2005/0210369 A1 | 9/2005 | Damm, Jr. | |
| 2006/0005151 A1 | 1/2006 | Altman | |
| 2006/0036945 A1 | 2/2006 | Radtke et al. | |
| 2006/0136807 A1 | 6/2006 | Yalovsky et al. | |
| 2006/0161846 A1 | 7/2006 | Van Leeuwen | |
| 2006/0244735 A1 * | 11/2006 | Wilson | 345/173 |
| 2006/0253803 A1 | 11/2006 | Backlund | |
| 2007/0101292 A1 | 5/2007 | Kupka | |
| 2007/0115264 A1 | 5/2007 | Yu et al. | |
| 2007/0157085 A1 | 7/2007 | Peters | |
| 2007/0260981 A1 * | 11/2007 | Kim et al. | 715/531 |
| 2007/0294644 A1 * | 12/2007 | Yost | 715/856 |
| 2008/0165136 A1 | 7/2008 | Christie et al. | |
| 2008/0165142 A1 | 7/2008 | Kocienda et al. | |
| 2008/0259040 A1 | 10/2008 | Ording et al. | |
| 2009/0002326 A1 | 1/2009 | Pihlaja | |
| 2009/0109182 A1 | 4/2009 | Fyke et al. | |
| 2009/0128505 A1 * | 5/2009 | Partridge | G06F 3/04883 345/173 |
| 2009/0167700 A1 | 7/2009 | Westerman et al. | |
| 2009/0213134 A1 | 8/2009 | Stephanick et al. | |
| 2009/0228792 A1 | 9/2009 | Van et al. | |
| 2009/0228842 A1 | 9/2009 | Westerman et al. | |
| 2009/0295826 A1 | 12/2009 | Good et al. | |
| 2010/0042933 A1 | 2/2010 | Ragusa | |
| 2010/0070281 A1 * | 3/2010 | Conkie | G06F 3/0482 704/260 |
| 2010/0134425 A1 | 6/2010 | Storrusten | |
| 2010/0171713 A1 | 7/2010 | Kwok | |
| 2010/0235726 A1 | 9/2010 | Ording et al. | |
| 2010/0235729 A1 | 9/2010 | Kocienda | |
| 2010/0235793 A1 * | 9/2010 | Ording et al. | 715/863 |
| 2010/0245261 A1 | 9/2010 | Karlsson | |
| 2010/0269039 A1 | 10/2010 | Pahlavan et al. | |
| 2010/0289752 A1 * | 11/2010 | Birkler | 345/173 |
| 2010/0289757 A1 | 11/2010 | Budelli | |
| 2010/0293460 A1 * | 11/2010 | Budelli | 715/702 |
| 2010/0299587 A1 | 11/2010 | Swett | |
| 2010/0309147 A1 * | 12/2010 | Fleizach | G06F 3/04883 345/173 |
| 2010/0328227 A1 | 12/2010 | Matejka et al. | |
| 2011/0018812 A1 * | 1/2011 | Baird | G06F 3/04886 345/173 |
| 2011/0081083 A1 | 4/2011 | Lee et al. | |
| 2011/0107211 A1 | 5/2011 | Chu et al. | |
| 2011/0131481 A1 | 6/2011 | Vronay et al. | |
| 2011/0163968 A1 | 7/2011 | Hogan | |
| 2011/0202835 A1 | 8/2011 | Jakobsson et al. | |
| 2011/0225525 A1 | 9/2011 | Chasman et al. | |
| 2011/0264993 A1 | 10/2011 | Leong et al. | |
| 2012/0013539 A1 | 1/2012 | Hogan et al. | |
| 2012/0013540 A1 | 1/2012 | Hogan | |
| 2012/0030566 A1 | 2/2012 | Victor | |
| 2012/0032979 A1 * | 2/2012 | Blow et al. | 345/647 |
| 2012/0139844 A1 | 6/2012 | Ramstein et al. | |
| 2012/0151394 A1 | 6/2012 | Locke | |
| 2012/0185805 A1 | 7/2012 | Louch et al. | |
| 2012/0272179 A1 * | 10/2012 | Stafford | 715/781 |
| 2012/0306772 A1 | 12/2012 | Tan et al. | |
| 2012/0311507 A1 * | 12/2012 | Murrett et al. | 715/863 |
| 2013/0002719 A1 * | 1/2013 | Ide | 345/660 |
| 2013/0024820 A1 * | 1/2013 | Kirkpatrick | 715/863 |
| 2014/0002377 A1 | 1/2014 | Brauninger et al. | |

FOREIGN PATENT DOCUMENTS

| | | |
|---|---|---|
| EP | 2098947 A2 | 9/2009 |
| GB | 2301758 A | 12/1996 |
| JP | 09244813 A | 9/1997 |
| JP | 2006185443 A | 7/2006 |
| JP | 2007299394 A | 11/2007 |
| WO | 2007097644 A2 | 8/2007 |
| WO | 2009085779 A1 | 7/2009 |
| WO | 2010040216 A1 | 4/2010 |
| WO | 2010107653 A2 | 9/2010 |

OTHER PUBLICATIONS

Apple, Inc., iPhone User Guide for iOS 4.2 and 4.3 Software, Chapter 3 "Basics," pp. 37-40, published Mar. 11, 2011.
Benko et al., "Precise selection techniques for multi-touch screens," Proc. CHI '06, published Apr. 22-28, 2006, downloaded Jun. 21, 2011 from http://citeseerx.ist.psu.edu/viewdoc/download?doi=10.1.1.67.6740&rep=rep1&type=pdf.
Vogel et al., "Shift: a technique for operating pen-based interfaces using touch," Proc. CHI '07 pp. 657-666, published Apr. 28, 2007, downloaded Jun. 21, 2011 from http://citeseerx.ist.psu.edu/viewdoc/download? doi=10.1.1.79.2710&rep=rep1&type=pdf.
Office Action from U.S. Appl. No. 13/230,524 mailed Mar. 1, 2013.
Int'l. Preliminary Examination Report, including Written Opinion, mailed Mar. 12, 2014, in connection with PCT Appl. Ser. No. PCT/US2011/055765.
Second office action, mailed Dec. 19, 2013 in related U.S. Appl. No. 13/230,524.
Supplementary Search Report Issued in European Patent Application No. 11872529.0, Mailed Date: Mar. 18, 2015, 10 Pages.
Final Office Action Issued in U.S. Appl. No. 13/230,524, Mailed Date: Jul. 29, 2015, 16 Pages.
Non-Final Office Action Issued in U.S. Appl. No. 13/230,524, Mailed Date: Dec. 17, 2014, 14 Pages.
First Office Action and Search Report Issued in Chinese Patent Application No. 201210335577.9, Mailed date: Aug. 8, 2014, 12 Pages.
Second Office Action and Search Report Issued in Chinese Patent Application No. 201210335577.9, Mailed Date: Apr. 14, 2015, 11 Pages.
International Search Report & Written Opinion Issued Issued in PCT Application No. PCT/US2013/051749, Mailed Date: May 21, 2014, 17 Pages.
Final Office Action Issued in U.S. Appl. No. 13/540,594, Mailed Dated: Dec. 4, 2014, 21 Pages.
Amendment with RCE in U.S. Appl. No. 13/540,594, Filed on: Apr. 6, 2015, 14 Pages.

(56) References Cited

OTHER PUBLICATIONS

Non-Final Office Action issued in U.S. Appl. No. 13/540,594, Mailed Date: Jul. 31, 2014, 20 Pages.
Non-Final Office Action Issued in U.S. Appl. No. 13/540,594, Mailed Dated: Jun. 3, 2015, 23 Pages.
Final Office Action Issued in U.S. Appl. No. 13/557,212, Mailed Date: Jan. 2, 2015, 25 Pages.
Non-Final Office Action Issued in U.S. Appl. No. 13/557,212, Mailed Date: Apr. 25, 2014, 21 Pages.
Non-Final Office Action Issued in U.S. Appl. No. 13/557,212, Mailed Date: Nov. 23, 2015, 37 Pages.
International Search Report and Written Opinion Issued in PCT Application No. PCT/US2013/048993, Mailed Date: Sep. 30, 2013, 8 Pages.
International Preliminary Report on Patentability Issued in International Application No. PCT/US2013/051749, Mailed dated: Jan. 12, 2015, 8 Pages.
Second Written Opinion Issued in PCT Application No. PCT/US2013/051749, Mailed Date: Sep. 25, 2014, 7 Pages.
Walkenbach, John, "Excel 2007 Bible", John Wiley & Sons, Published on: Jan. 3, 2007, 9 Pages.
Xu, et al., "Enabling Efficient Browsing and Manipulation of Web Tables on Smartphone", In Human-Computer Interaction. Towards Mobile and Intelligent Interaction Environments, vol. 6763, Jul. 9, 2011, pp. 117-126.
"Documents To Go for iPhone/iPad/iPod Touch Help", Retrieved on: Mar. 23, 2012, Available at: <<www.dataviz.com/DTG_iphone_manual.html#_Working_with_Excel>>, 13 Pages.
"How to Highlight, Cut, Copy and Paste Text Using a BlackBerry Smartphone", Published on: Oct. 26, 2011, Available at: <<http://helpblog.blackberry.com/2011110/edit-text-blackberry>>, 7 Pages.
"Numbers for iOS (iPhone, iPod Touch): Add, Remove, Resize, and Rearrange Table Rows and Columns", Retrieved on: Jul. 24, 2012, Available at: <<http://web.archive.org/web/20141012231847/http://support.apple.com/kb/PH3417?viewlocale=en_US>>, 2 Pages.
Office Action Issued in European Patent Application No. 11872529.0, Mailed Date: Jan. 5, 2016, 5 Pages.

\* cited by examiner

EXPLICIT TOUCH SELECTION AND CURSOR PLACEMENT

CROSS-REFERENCE TO RELATED APPLICATIONS

This application is a continuation of U.S. patent application Ser. No. 13/230,524, filed Sep. 12, 2011.

BACKGROUND

Touch screen devices often have cumbersome on-screen user interfaces. Various ways of interacting with touch screens are known in the art. For example, using a stylus pen or fingers as input devices. The user experience may be further complicated when using one or more fingers as an input device. Placing a cursor and selecting text can be difficult using a finger because precision is much lower than with other input devices, such as a mouse. For example, placing a cursor at a precise point within a word can be difficult due to the size of the finger relative to the size of the word.

A user may want to place a cursor so that text being displayed by a computing device may be edited. Similarly, text may be selected so that it may be copied, cut, or overwritten by pasting text or entering new text. These operations, which are known in the art, have proven difficult to implement with touch screen devices due to the imprecision of using one or more fingers to interact with a touch screen. The speed and ease of selecting text is also reduced when the user interface requires the user to enter complicated commands such as pressing and holding the selected text. The above operations are an even more difficult problem for portable electronic devices.

User interfaces known in the art display a cursor that may make it difficult for a user to discern the exact location where text will be inserted when entered by the user. Furthermore, when selecting text, present user interfaces often require that the user's finger block the portion of text being selected. Thus, these user interfaces often utilize an offset representation of the text being selected which requires unintuitive and unnecessary hand-eye coordination.

Selecting text on multiple lines can be difficult because the lines of text typically occupy a small vertical space relative to the size of a user's finger. It is also very difficult for humans to move their finger in a straight line. This results in errors when a user attempts to select text on a single line but the user's finger moves just outside of the vertical space defined by the line of text causing the computing device to interpret the user's input as purposefully changing lines.

SUMMARY

In modern touch screen devices, users expect an intuitive and simple user interface that allows efficient operation of the device. Described herein are techniques for implementing a user interface with simple cursor placement and occlusion-free text selection. The user interface is optimized such that users of mobile devices, e.g. handheld devices, laptops, or tablet computers, may quickly and efficiently perform these operations.

Cursor placement may be achieved with a simple tap input from a user. Initially, a cursor may be placed coarsely. Upon further input from the user, the cursor may be placed more precisely. A visual indication of a location on the screen that the user may interact with, referred to as a "gripper," may be displayed below the line of text with which it is associated. The user interface may also implement "safety zones" that allow the user to more accurately select text on a single line of text In some embodiments, a cursor may be placed on a display screen of a computing device by receiving a location indication from a user, wherein the indication from the user indicates some text or character string. An initial cursor location is selected based on the location indication, in combination with other information about the displayed content, and the cursor is displayed at that location, wherein the initial cursor location coarsely positioned relative to the location indicated by the user. The computing device is then placed in a state in which execution of a function is based on the initial cursor location. A second location indication may then be received. A more precise cursor location may be selected based on the second location indication, and the cursor is displayed in the more precise cursor location.

In some embodiments, a computer system with a display screen, a sensor and a processor implement a user interface for selecting text. A string of characters, such as text, is displayed on the display screen along with a "gripper." A user may drag the gripper, as determined by the sensor, from a first location associated with a first character of the string to a second character of the string. The text between the first and second characters is highlighted and a gripper is displayed again at the first location and a second gripper is displayed at a location corresponding to the second character of the string.

In some embodiments, multiple lines of text may be displayed by a display screen. A portion of the text may be selected, which may be indicated by highlighting the text. A user may adjust the portion of text that is selected by dragging an end point of the selected text. As the drag input is being received, the selected text is updated based on the current location the user is indicating. In a first mode, the device allows a relatively large threshold for error in the vertical location indicated by the user such that the end point does not change lines unless the user moves past the threshold distance. Once the threshold distance is passed and the device continues to receive the drag input from the user, the device enters a second mode where a threshold distance smaller than the relatively large threshold is used. Thus, in the second mode, a user can move the end point of the selected text from line to line by simply passing the relatively small threshold distance.

Some methods for selecting and highlighting may be executed by a processor of a computing system executing instructions stored on a computer readable storage device.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that to provide an easy to use and efficient user interface for a touch screen device, it is desirable for placing a cursor to be simple, straightforward and take into account the imprecision that results from using a finger to input commands to the device. The inventors have further recognized and appreciated that providing a user interface that allows a user to interact directly with text being selected without a finger occluding the text results in an intuitive, efficient user experience.

Figure 1:
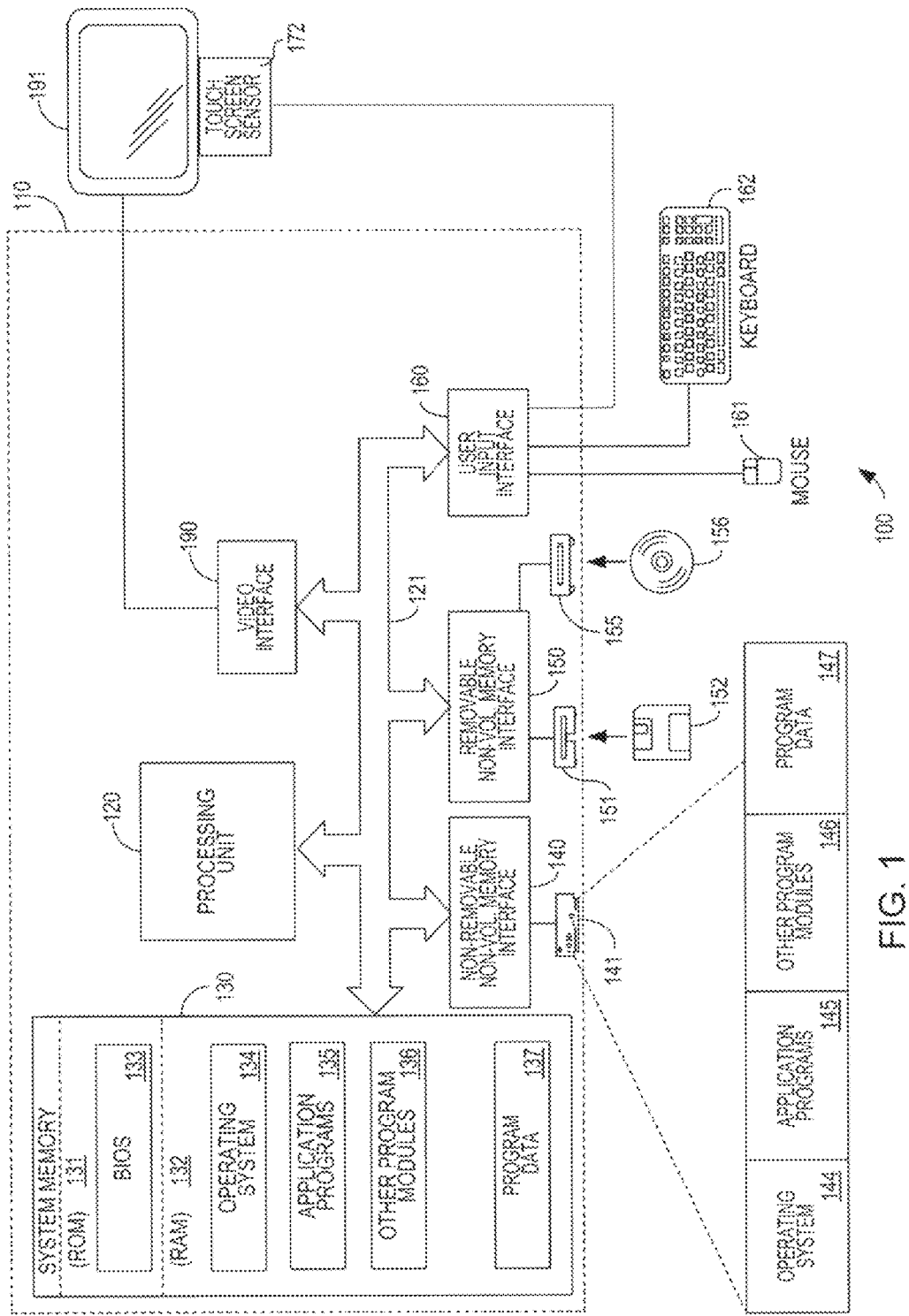
FIG. 1 is a block diagram of an exemplary environment in which embodiments of the invention may operate.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, cellular phones, tablet computers, netbooks, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing an efficient, user-friendly user interface includes a general purpose computing device in the form of a computer 110. Components of computer 110 may include, but are not limited to, a processing unit 120 (i.e. processor), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 may include a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system (OS) 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM, DVD or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and a pointing device 161, commonly referred to as a mouse, trackball or touch pad. These input devices may be present in some embodiments, but are not required for operation of computer 110. In some embodiments, a display screen 191 includes a touch screen sensor 172 that may receive inputs from a user's one or more fingers or other input device, such as a stylus or pen. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). The monitor 191 or other type of display device is also connected to the system bus 121 via an interface, such as a video interface 190.

OS 134 may comprise a touch screen engine associated with the touch screen. The touch screen engine receives input from the touch sensor 172, processes the input and provides information pertaining to the input to other components, such as other components of the OS 134, application programs 135, or other program modules 136. Inputs from the touch screen sensor 172 may indicate a selection of characters or other items displayed on the screen 191. The inputs may also indicate a position of a cursor, as selected by the user. The touch screen engine may also receive information from the other components and render the information on display screen 191. For example, the OS 132 may provide information to the touch screen engine to display in a context menu on display 191. Embodiments of the invention may be implemented to alter the way components identify selections and cursor locations. Embodiments may also alter the way the user interface is presented to indicate character selection and cursor location.

Figure 2:
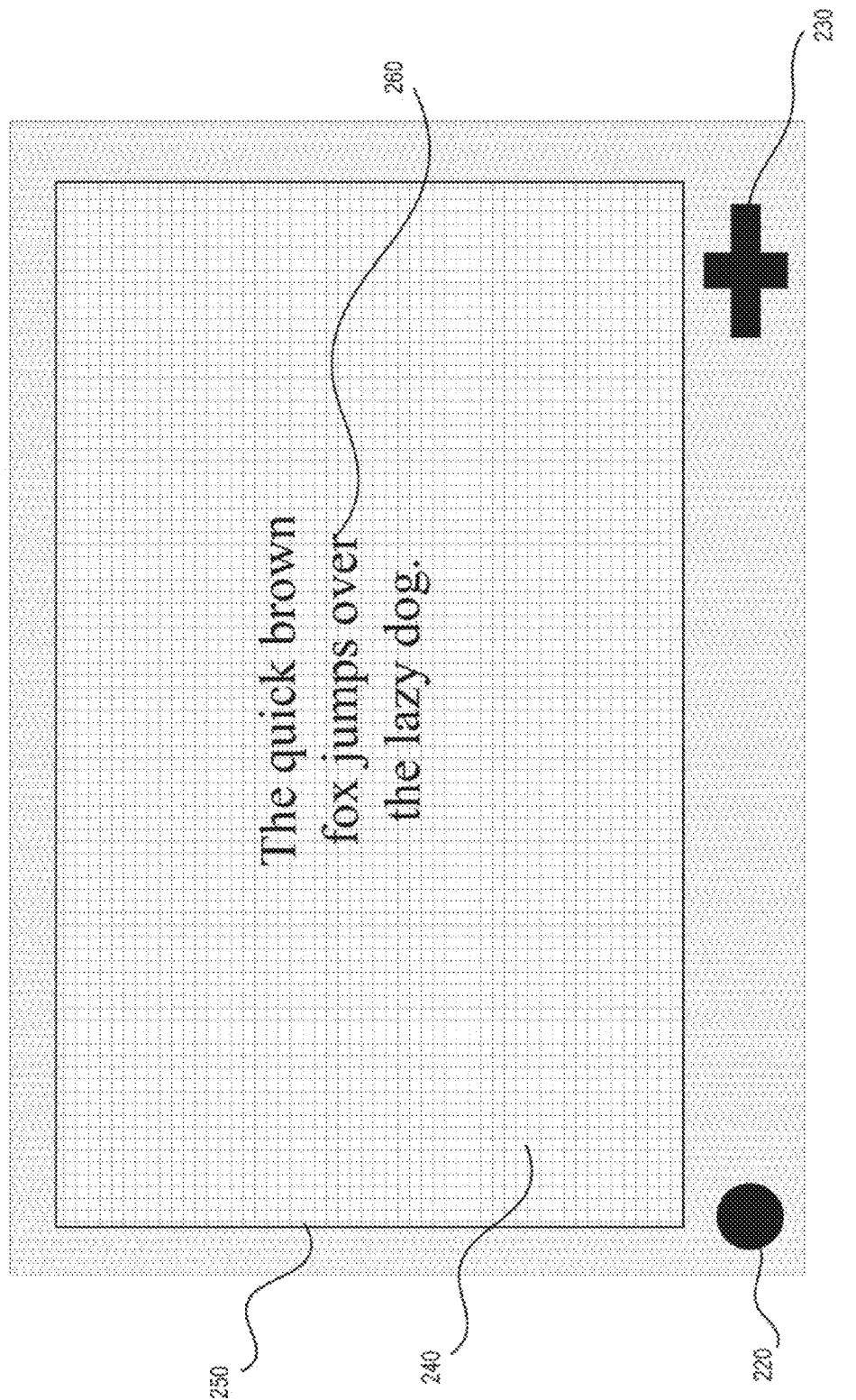
FIG. 2 is a simplified diagram of an exemplary computing device in which embodiments of the invention may operate.

FIG. 2 illustrates a simplified diagram of an exemplary computing device 200 of one embodiment of the invention. The computing device 200 may have some or all of the components described above in conjunction with FIG. 1, however it is not limited to include all of the features of FIG. 1. The illustrated components of computing device 200 may be laid out in any manner and are not limited to the specific layout or components shown in FIG. 2.

Computing device 200 comprises a display screen 250 for displaying one or more strings of characters 260. The strings may comprise any characters, for example, letters, numbers, punctuation, and the space character, to name a few. A string may be a single word, a sentence, a paragraph or any other collection of characters. The example embodiment of FIG. 2, shows the strings of characters 260 comprise a multi-line sentence of text that includes letters, spaces and punctuation. Though text with Latin letters is used as an example of characters herein, embodiments of the invention are not limited to any particular implementation. For example, some embodiments may use Japanese, Chinese, Korean, Arabic or Hindi characters. Embodiments of the invention may be used with vertical languages, wherein strings of characters are arranged in the vertical direction.

The display screen 250 of computing device 200 is associated with one or more touch screen sensors 240. The combination of sensors and display screen may be referred to as a touch screen. Thus, the computing device 200 may be referred to as a touch screen device. The computing device 200 may employ any type of touch screen technology. For example, the touch screen may be resistive, capacitive, acoustic, infrared or any other touch screen technology. Input may be received by the touch screen sensors 240 by a stylus, pen or a user's body, such as one or more fingers. Embodiments of the invention are not limited to any particular implementation of touch screens.

In addition to accepting input via the one or more touch screen sensors 240, the computing device 200 may have one or more buttons 230 for accepting input from a user. The buttons may be on the front, back or sides of the computing device 200. They may be mechanical buttons, rotary input devices, capacitive buttons or any other type of input device known in the art. As discussed in connection with FIG. 1, the computing device 200 may also have a keyboard, mouse or other input devices for receiving input from the user, but these are not necessary. FIG. 2 illustrates buttons 230 as a four-direction directional pad for indicating directional information to the computing device 200. A power button 220 is also shown, which indicates to the computing device whether to turn on/off or go into a standby mode. Embodiments of the invention are not limited to any particular implementation of buttons or input devices.

A user of computing device 200 may want to perform functions on text 260 displayed on the display screen 250. To perform a function, the user may use the touch screen to indicate the desired placement of a cursor and/or the desired text to be selected. The cursor may be any visual indicator of a location, such as a caret or an arrow.

Functions may be dependent on the location of a cursor or on text that has been selected by the user. Functions may also depend on other setting of the device. For example, if a cursor is placed at a particular location and additional text is entered by the user, the additional text may be inserted at the location of the cursor or the additional text may overwrite existing text following the cursor based on whether the device is in an insert mode or an overwrite mode. A paste function may also be performed based on the placement of the cursor such that text that has previously been cut or copied may be inserted at the cursor location. Another example is selecting a delete command, which may delete one or more characters immediately adjacent to the cursor, such as characters before the cursor or after the cursor.

The same functions listed above may be executed when text is selected, but the behavior will be different based on text being selected. For example, if additional text is entered or pasted when text is selected, the selected text will be overwritten with the additional text. Selecting a delete command will delete the selected text. There may be additional functions available to the user when text is selected. For example, the selected text may be copied or cut. Also, the style of the selected text may be changed by the user. For example, the selected text may be made bold or italic, the font may be changed, or the size of the font may be changed.

This different behavior of functions based on whether a cursor is at a specific location or text is selected may be described as the device being in a first state and a second state.

It should be noted that the computing device 200 may perform corrections to the user's selections such that the indicated location determined by the computing device 200 may not correspond exactly to the physical location at which a user touch was detected on the touch screen. For example, it is known for a user of a touch screen device to touch the screen at a location that is slightly lower than the actual location they wish to indicate. This is merely an issue of perspective that the computing device can automatically correct. Thus, embodiments of the present invention may user locations that have already been corrected to account for this effect and other similar effects. The input received by the user via the touch screen sensor 240 may be any suitable input command. In some embodiments, the input may be a "tap input," indicating that the user touched the screen for only brief moment. The tap may be detected by techniques known in the art. A brief moment is typically less than one second. In some embodiments, the input may be a drag input, wherein the user touches the screen with a finger at a beginning location, creates a path by dragging the finger across the screen (while maintaining contact with the screen), and terminates the path by lifting the finger at an ending location. In other embodiments, the input may be a press and hold input, wherein the user touches the screen at a location, holds it for a period of time, and then terminates contact with the screen. Each of these types of input may be detected using different techniques as is known in the art. Embodiments of the invention are not limited to any particular type of input.

Due to the size of a user's finger, which may be, for example 1-2 cm in width or height, location indications received via a touch screen may be imprecise relative to items displayed on the screen (fractions of 1 mm in size). Therefore, the user interface of some embodiments of the invention will, upon a first location indication from a user, place the cursor in an approximate location relative to the string of characters being selected. Then, if the user wishes to place the cursor more precisely, a second indication may be input to the device and the cursor will be placed at a more precise location associated with the input. This approximate, or rough, placement of the cursor may be implemented in any way and embodiments of the invention are not limited in this respect. If the computing device places the cursor using approximate placement, the computing device may be said to be in a first state. If the computing device is placing the cursor using more precisely, the computing device may be said to be in a second state. In some embodiments, whether the device will use precise placement or approximate placement will depend on characteristics of the objects being displayed. For example, if the display includes text that is larger than a predetermined threshold, then the device may only implement precise placement of the cursor. In some embodiments, the predetermined text size threshold may be related to the approximate size of a user's finger. Thus, the device may not use approximate placement when the size of the user's finger is approximately the same size as the items displayed on the screen.

Figure 4A:
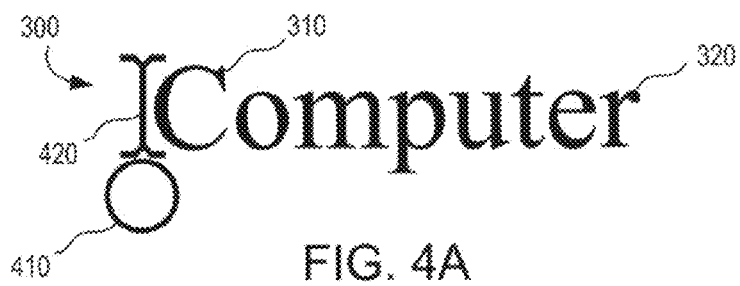
FIGS. 4A-4C illustrate example placement of a cursor used in some embodiments of the invention.
Figure 4B:
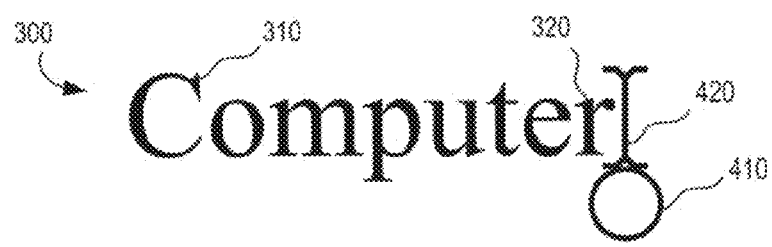

Approximate placement of a cursor 420 may be implemented in any suitable way. In some embodiments, an input is received from a user that indicates a particular string of characters on the display screen. The computing device 200 determines the input to be a command to place the cursor at a location associated with that word. The number of possible locations at which a cursor may be placed may be reduced compared to when precise placement is being used. Fewer possible locations results in course cursor placement, whereas fine cursor placement has a larger number of possible locations. For example, approximate cursor placement may only allow placement of the cursor at the beginning of a string 300, as shown in FIG. 4A, or the end of the string, as shown in FIG. 4B. Determining whether the cursor is placed at the beginning or the end of the string may be determined in any suitable way. For example, the word may be split into multi-character portions, such as a first half and a second half. If the location of the user's input indicates the first half, then the cursor will be displayed at the beginning of the string. If, on the other hand, the user's input indicates the second half, then the cursor will be displayed at the end of the string. This type of approximate placement accounts for the fact that a user may want to place the cursor at the beginning or end of a word, rather than somewhere in the middle, even if the user's input does not indicate a location at the beginning or end of a word. Thus, approximate placement makes it easy for a user to specify the beginning or end of a word, but provide an easy way to switch to a more precise cursor placement mode.

Figure 3A:
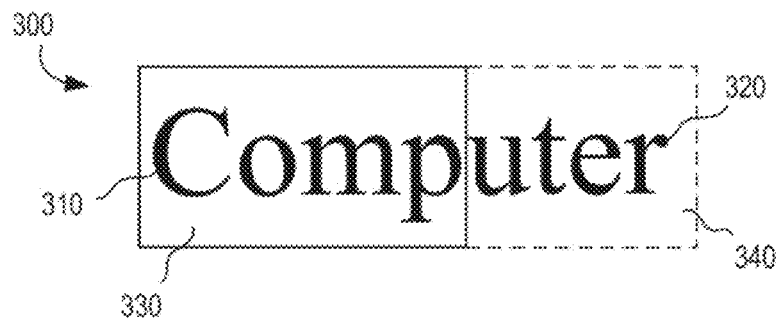
FIGS. 3A-3C illustrate example apportionments of a string of characters used in some embodiments of the invention.
Figure 3B:
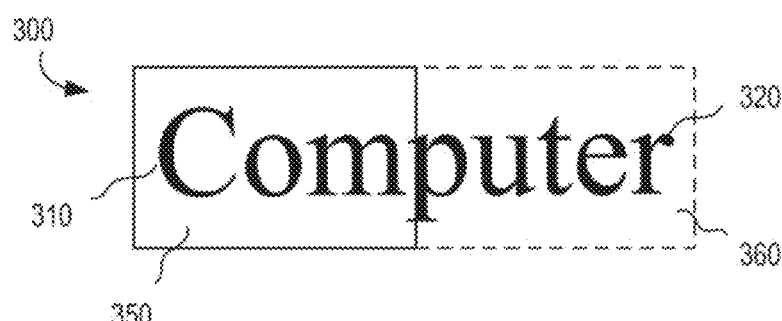

In the above example where the beginning and the end of a string are the only options for approximately placing the cursor, the computing device 200 may determine whether to place the cursor at the beginning or the end in any suitable way. In some embodiments, as illustrated in FIGS. 3A and 3B, the string 300 is split into two portions. If the user's input indicates the beginning portion of the string, then the cursor 420 is placed at the beginning of the string, i.e. before the beginning character 310 of the string 300. If the user's input indicates the ending portion of the string, then the cursor 420 is placed at the end of the string, i.e. after the ending character 320 of the string.

The string may be split into portions in any suitable manner. For example, FIG. 3A illustrates the string "Computer" split in half such that there are an equal number of letters in each portion. The first portion 330 comprises "Comp" and the second portion 340 comprises "uter." Alternatively, FIG. 3B illustrates the same string 300 split in half such that there are an equal number of pixels in each half. The first portion 350 comprises "Com" and a small portion of the letter "p" and the second portion 360 comprises the remaining portion of the letter "p" and the letters "uter." Note that the size of the portions differ depending on how the string is split. Embodiments of the invention are not limited to splitting strings into equal portions. For example, the ending portion may be intentionally larger than the beginning portion if the designer of the user interface believes that a user is more likely to want the cursor placed at the end of a string rather than at the beginning of the string. Embodiments of the invention are not limited to a particular implementation of segmentation.

Figure 3C:
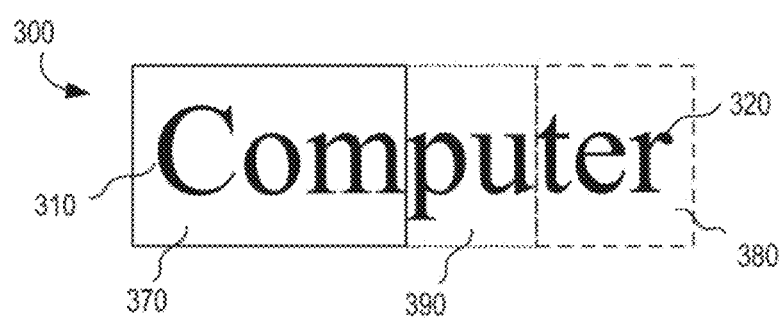

Furthermore, embodiments of the invention are not limited to splitting the string 300 into two portions. For example, in FIG. 3C the string 300 is split into three portions: a beginning portion 370 comprises the first three characters of string 300; an ending portion 380 comprises the last three characters of string 300; and an intermediate portion 390 comprises the remaining characters of string 300, between the beginning portion 370 and the ending portion 380. One of skill in the art would realize that any predetermined number of characters may be used to define the beginning and ending portions. The illustration of FIG. 3C used three characters by way of example.

If the user's input indicates a location corresponding to the beginning portion 370 of string 300, then the cursor 420 will be placed before the beginning letter 310 of the string 300, as shown in FIG. 4A. If the user's input indicates a location corresponding to the ending portion 380 of string 300, then the cursor 420 will be placed after the ending letter 310 of the string 300, as shown in FIG. 4B. If the user's input indicates a location corresponding to the intermediate portion 390 of string 300, then the cursor may be placed in any suitable way.

Figure 4C:
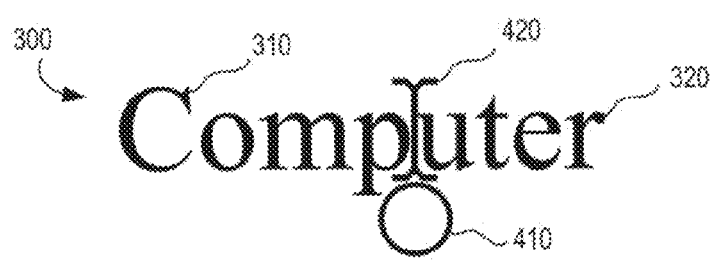

In some embodiments, the cursor may be placed at the beginning of the intermediate portion 390. In other embodiments, the computing device places the cursor at the end of the intermediate portion 390. Some embodiments may place the cursor in the middle of the intermediate portion. In yet another embodiment, when a user's input corresponds to the intermediate portion 390, the computing device 200 may place the cursor using precise placement such that the cursor is placed at a location corresponding to the location indicated by the user's input. For example, in FIG. 3C, if the user indicates a location between the "p" and "u" of the string, then the cursor will be placed at that location, as shown in FIG. 4C. Whereas if the user indicates a location near the beginning of the "p," the cursor will be placed before the "p." Embodiments of the invention are not limited to a particular implementation of cursor placement.

Once computing device 200 coarsely places the cursor 420, the user may wish to place the cursor 420 at a more precise location within the same string 300. The number of possible locations to place the cursor is greater than the number of locations available when using coarse placement. Precise placement, or fine placement, of a cursor 420 may be implemented in any suitable way. For example, if the user indicates a second location within the same string 300, then the computing device 200 will select a location corresponding to the second location from a plurality of possible placement locations, wherein there is a greater number of possible placement locations when the computing device 200 performs precise cursor placement than the number of possible placement locations that were available during approximate cursor placement. In some embodiments, the plurality of possible placement locations may comprise each location adjacent to each character of the string 300. For example, a user's first input may correspond to a first location and the cursor may be approximately placed at the beginning of the string 300 (see FIG. 4A). When a second input is received corresponding to a second location between the letter "p" and "u", then the computing device will place the cursor 420 between the "p" and "u," as shown in FIG. 4C.

In some embodiments, both the first input, for approximate cursor placement, and the second input, for precise cursor placement, may be tap inputs. This allows the user to quickly place the cursor at a desired location very quickly and accurately without relying on inputs such as a drag input or a press and hold input. Tap inputs are particularly advantageous in portable devices. Embodiments of the invention are not limited to the type of input the user uses.

In some embodiments, when the display screen 250 displays cursor 420, a "gripper" 410 is also displayed. A gripper is a graphical indication on the screen with which a user may interact and convey further input information to the computing device 200. A gripper may be implemented in any suitable way. For example, the gripper 410 may be displayed below the cursor 420, as illustrated in FIGS. 4A-4C. Embodiments of the invention are not limited to any particular size of gripper. For example, grippers may be in the range of 5 mm to 15 mm in size. In some embodiments the grippers are 8 mm wide. It is possible that the grippers may be larger in one dimension than in a second dimension. For example, a gripper may be elliptical, having a height of 10 mm and a width of 6 mm. The exact size of the gripper is not crucial and any size may be used. In some embodiments the size of the gripper is independent of the screen size and resolution. For example, a gripper displayed on the screen of a mobile phone device may have the same width as a gripper displayed on a large touch screen display screen associated with a computer. As a result, when rendered, parameters used by computing device 200 to render the grippers may be selected to yield the selected size. These parameters may include the screen height, screen width, pixel size, and/or screen resolution.

Figure 8A:
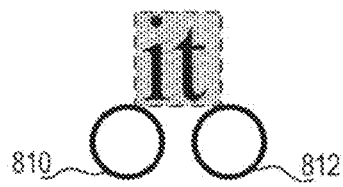
FIGS. 8A-8E illustrate example grippers used in some embodiments of the invention.

FIGS. 8A-8E illustrate example embodiments of grippers. As will be discussed in more detail below, when text is selected by a user, it may be highlighted and two grippers may be displayed: one gripper at the beginning of the selected text and one gripper at the end of the selected text. FIG. 8A shows an embodiment wherein the first gripper 810 and the second gripper 820 are identical circles. The interior of the circles may be a solid color, completely transparent, or any of transparency between a solid color and completely transparent.

Figure 8B:
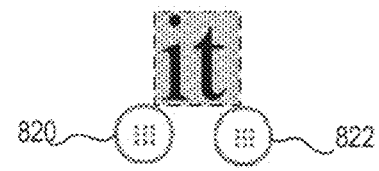

FIG. 8B shows example grippers 820 and 822 that are circles with a graphic on the interior. Any suitable graphic may be used. In the example shown, vertical lines are used to indicate texture such that a user will realize that the grippers are interactive and may be used to input commands.

Figure 8C:
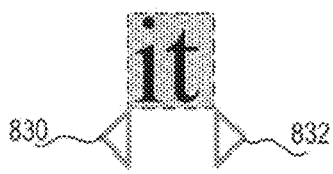
Figure 8D:
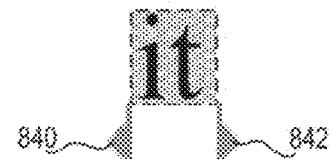

FIG. 8C illustrates a beginning gripper 830 that is a mirror image of the ending gripper 832. The two grippers are triangles that point outward. Like with the circular gripper, the interior of the triangles may be fully opaque, fully transparent, or anywhere in between. FIG. 8D also shows triangular grippers 840 and 842, but with the addition of vertical lines to more precisely indicate the where the beginning and end of the selected text is.

Figure 8E:
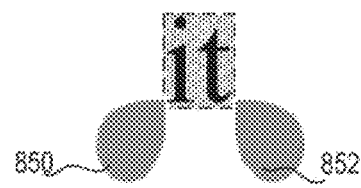

FIG. 8E illustrates grippers 850 and 852 that are non-standard shapes. They are rounded at the bottom with a point near the top that can more precisely indicate the beginning and end of the selected text than a completely round shape.

The aforementioned grippers are for exemplary purposes and embodiments of the invention are not limited to any particular shape. For example, any image or icon may be selected by the user for the gripper image. In this way, grippers may be personalized to the user's preferred experience. In some embodiments the grippers are always displayed below the line of text associated with the selected characters. In the case that text is not selected and, instead, a cursor is displayed, a gripper may be displayed below the cursor. Further, one of ordinary skill in the art would realize that there are many other variations of gripper shape and placement not shown that may be used and are covered by embodiments of the invention claimed herein. For example, if a vertical language is being displayed, grippers may be displayed to the left of the text.

As discussed above, the computing device 110 may receive input from various devices other than the touch screen sensor 172. In some embodiments, if the cursor 420 is being placed using these other devices, the touch screen engine may not display gripper 410 on display screen 191. For example, if the arrow keys on keyboard 162 or buttons 230 are used to move the cursor, the gripper may not be displayed.

Figure 5A:
FIGS. 5A-5C illustrate example text selection techniques used in some embodiments of the invention.

Using grippers to select text will now be discussed in conjunction with FIGS. 5A-5C. FIG. 5A illustrates the same cursor 420 location that was illustrated in FIG. 4B. The cursor 420 may be placed after the ending letter 320 of string 300 in any suitable way, for example, by approximate cursor placement. Computing device 200 displays gripper 410 below the cursor 420 such that when a user selects the gripper with a finger, the text associated with the cursor 420 and the gripper 410 is not occluded by the gripper or the user's finger. A user may press and drag the gripper to implement a "drag input." In some embodiments, when the touch screen engine receives a drag input from the user, but the initial location of the drag input does not correspond to the gripper, text will scroll or pan to display additional text, when it is available.

Figure 5B:
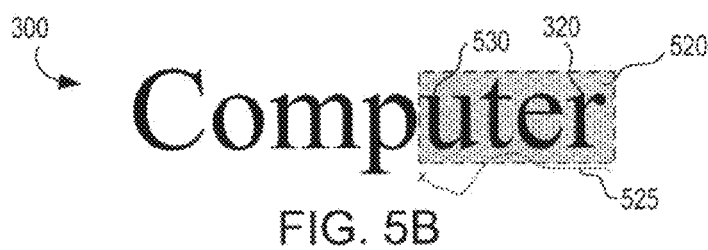

FIG. 5B illustrates a path 525 that a user's finger may trace across display screen 250 in a direction along the line of text.

In this example, the path 525 begins at a location corresponding to gripper 410, continues to the left, along the direction of the line of text, and ultimately terminates at a location denoted by an "x" when the user lifts the finger off the screen 250. Because the gripper 410 is far enough below the text so as not to visually block the text, the path may be below the string such that while the text is being selected, the user can still maintain visual line of sight with the text.

In some embodiments, the characters of the string are highlighted as the path 525, indicating a selection, is received from the user. For example, as the user's finger follows the path beneath the letter "r," the highlighted portion will grow to encompass the letter. The highlighting may be a shading 520 of the background behind the characters being selected and may indicate to the user that the character is being selected. As the user's finger continues, the other letters traversed by path 525 become part of the highlighted portion until the user completes the drag input by lifting the finger from the display screen 250. The ending location of the drag input corresponds to a character 530 and the text between character 530 and character 320, corresponding to the original cursor location, will be selected. As noted above, because the path is below the string, the user may maintain visual line of sight with the characters being selected.

In some embodiments the touch screen engine will not display gripper 410 and/or the cursor 420 while the drag input is being entered by the user. This removes unnecessary graphics that may distract or confuse the user and allows the user to simply concentrate on the characters being highlighted.

Figure 5C:
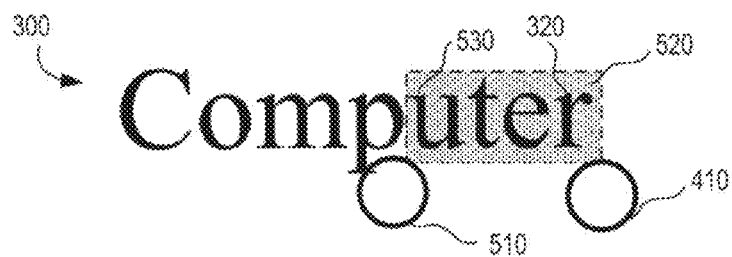

FIG. 5C illustrates the selected text after the drag input is complete. The touch screen engine instructs the display screen 191 to highlight the text between letter 320, corresponding to the original location of the cursor 420, and letter 530 corresponding to the location where path 525 ended. Gripper 410 may be displayed at the same location as before the drag input was received. The touch screen engine displays a new gripper 510 at the beginning of the selected characters of the string 300. The selected text may be further changed by similar interactions with either gripper 510 or gripper 410. A user may select more or fewer characters by providing further drag inputs with starting locations corresponding to one of the grippers.

In some embodiments, touch screen sensor 172 may receive a drag input from the user corresponding to gripper 410, shown in FIG. 5C. The drag input may terminate on the other side of gripper 510. For example, if the drag input terminated at the character "C" of string 300, then upon release of the drag input, the touch screen engine selects the characters "Comp", i.e. the text between the location of gripper 510 when the drag input was initiated and the location corresponding to the ending point of the drag input.

Figure 6A:
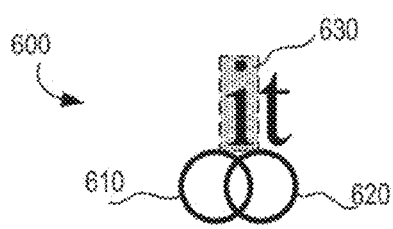
FIG. 6A illustrates an example user interface with overlapping grippers that some embodiments of the present invention avoid.
Figure 6B:
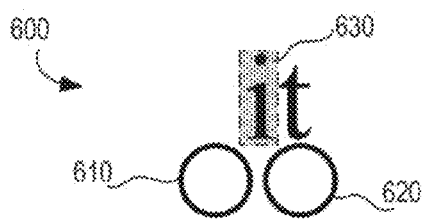
FIG. 6B illustrates an example user interface of some embodiments of the present invention that prevents overlapping grippers.

In some embodiments, the touch screen engine changes the shape and/or location of the grippers so that the two grippers do not overlap. FIG. 6A illustrates a problem that exists if grippers are allowed to overlap. This situation may arise when the number of characters is small, resulting in the width of the selected text to be less than twice the width of the grippers. This may also occur when the screen size is small, such as on a handheld device, and the grippers are set to be fixed size regardless of the screen size and resolution. Gripper 610 is associated with the beginning of the selected character of string 600 and gripper 620 is associated with the end of the selected character. The selected character is highlighted 630, as discussed above. The overlap between gripper 610 and gripper 620 will make selecting a particular gripper difficult for the user. The overlap may also be visually confusing to the user. FIG. 6B shows the result of keeping the grippers the same size, but moving the grippers away from the ends of the selected text. Both gripper 610 and gripper 620 are displayed further away from the highlighted text than they are when a greater number of characters is selected, for example in FIG. 5C. This prevents overlapping grippers and allows the user to easily interact with each gripper individually without confusing the user.

Figure 5D:
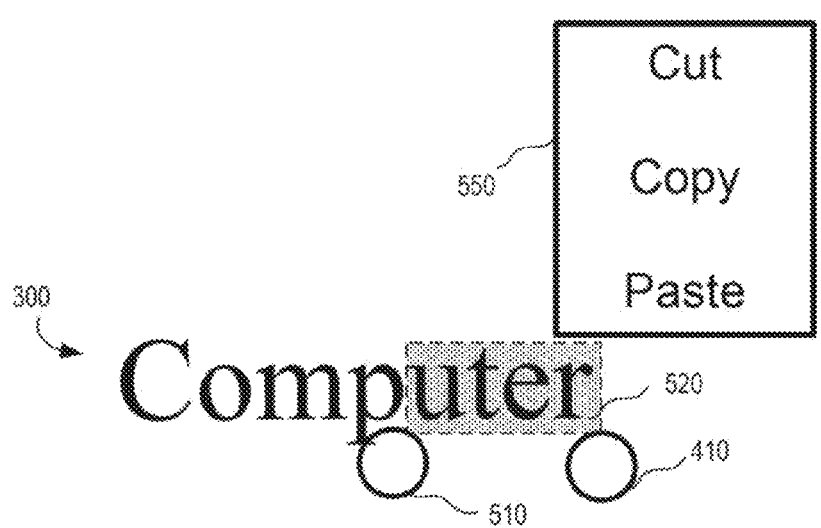
FIG. 5D illustrates an example context menu used in some embodiments of the invention.

Once the user selects text and the touch screen engine highlights the selected text, as illustrated in FIG. 5C, the user may select a function to execute based on the selected portion of text. As discussed above, examples of functions may be overwriting the text, re-formatting the text, deleting the text, or copying the text. Another function that may be performed based on the selected text is display a context menu 550. The context menu 550 may be displayed, for example, by providing an input corresponding to the highlighted text or one of the two grippers 410 and 510 as illustrated in FIG. 5D. The input may be in the form of a tap input, for example. The context menu 550 provides the user with various additional functions that may be performed to the selected text. The function options may be provided to the touch screen engine from the OS 134 or an application program 135. For example, if a web browser application is providing the text information to the touch screen engine for display on the screen, then it may be the web browser that provides the information for the context menu. The various additional function provided by the context menu 550 may be, for example, options to cut or copy the selected characters. The functions could also include options for re-formatting the selected text. The context menu 550 may also offer an option to paste characters that have been previously copied and overwrite the selected text. The context menu may provide many other options, which are not described herein, but one of ordinary skill in the art would understand to be covered by embodiments of the invention claimed herein. Furthermore, the context menu may be of any shape or size. For example, a context menu may be a rectangular menu, with functions displayed in a vertical list, as illustrated in FIG. 5D. In some embodiments, the context menu may be circular or elliptical and display functions radially. Embodiments of the invention are not limited to any particular size or shape of a context menu, nor are they limited to providing any of the specific functions described above.

Similarly, even when text is not selected and only a single gripper is displayed, as illustrated in FIG. 5A, a tap input of gripper 410 may result in the display of a context menu. The context menu may not display cut or copy options, since no text is selected, but it may provide a paste function or any other suitable function.

The above discussion of character selection was limited to text on a single line. However, selecting a subset of characters from a text block that occupies multiple lines is also an aspect of some embodiments of the invention. Specifically, the ability to determine when a user intends to select text on a different line than the line of text associated with the initiation of a drag input from a user. Input from a user's finger is imprecise and humans tend to trace paths on touch screens that are not straight and deviate from the user's intended path. Thus, some embodiments of the invention provide a "safety zone" associated with each line of text. A safety zone is a region surrounding a line of text wherein, as long as the path associated with a drag input from a user remains within the safety zone, the computing device 200 will determine that the user intended for the selection to stay on the same line of text. Safety zones also ensure that a selection initiated by the user begins on the line with which the cursor was originally associated. In some embodiments, the threshold distance away from a line of text that defines the boundary of a safety zone may change based on the actions of the user.

Figure 7A:
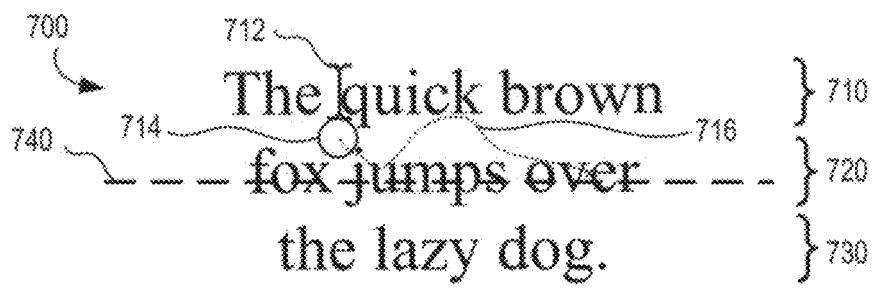
FIGS. 7A-7D illustrate example multiline text selection techniques used in some embodiments of the invention.

As an example of some embodiments of the invention, FIG. 7A shows text 700 that occupies a top line 710, a middle line 720, and a bottom line 730. Each line extends in one direction, for example, horizontally, while each line is adjacent to the next line in a second direction, for example, vertically. The cursor 712 is located at the beginning of the word "quick" on the first line 710. The cursor may have been placed at that particular location using any of the cursor placement techniques described above. The touch screen engine displays a gripper 714 below the cursor 712.

A user may enter a drag input beginning at the gripper 714, following a path 716, which terminates in a location associated with the second line 720. A safety zone boundary 740 is illustrated by a dashed line in FIG. 7A, though the line may not be displayed on the display screen. The boundary 740 is a certain distance from the first line of text 710 with which it is associated. The distance may be a function of any number of parameters. For example, the distance may be some predetermined length away from the text or a predetermined number of pixels away from the text. In some embodiments, the distance may be dynamic. The distance may be a function of the vertical line height, the size of the space between lines of text, the screen size, or the screen resolution. In the example shown in FIG. 7A, the boundary 740 is at a vertical level occupied by the second line of text 720. If the path 716 of the drag input does not pass the boundary 740, the computing device determines that the user did not intend to select text in the second line 720. For example, the path 716 illustrated in FIG. 7A terminates just above the boundary 740 and at a horizontal location corresponding to a location between the letters "o" and "w" on the first line of text 710. Therefore, the computing device determines that the user wanted to select the text "quick bro" on the first line 710.

Figure 7B:
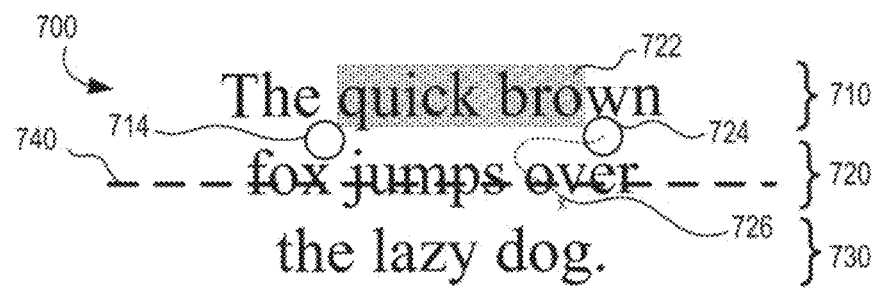

FIG. 7B illustrates what would be displayed after receiving the above drag input corresponding to path 716 of FIG. 7A. The touch screen engine highlights 722 the text "quick bro" and there is a first gripper 714 at the beginning of the highlighted text and a second gripper 724 at the end of the highlighted text. The user may enter a second drag input with a starting point corresponding to gripper 724 and following path 726, which terminates between the "o" and "v" of the second line of text 720 and is below the boundary 740. Because the drag input terminated below the boundary 740, the computing device 200 determines that the user intended to select text in the second line 720. Therefore, FIG. 7C shows that the all of the characters after the location associated with the first gripper 714 on the first line are selected and all of the characters from the beginning of the second line to the location associated with the termination of path 726 is highlighted 722.

Figure 7C:
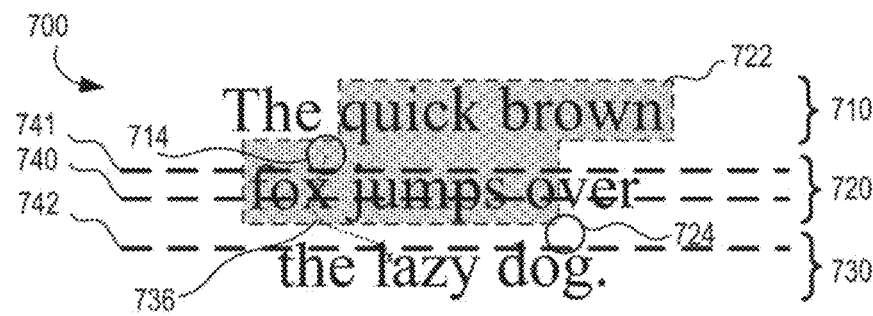

FIG. 7C also illustrates a change in the threshold distance associated with the safety zone of the first line 710. While the user enters the drag input, if the path 726 crosses the boundary 740 associated with the safety zone of the first line 710, then the location of the boundary will shift to be close to the text of the first line, as illustrated by boundary 741. By giving the user leeway in the location of the path while selecting text, it is easier for the user to select text only on a single line until the user's input indicates that the user wants to expand the selected text to include adjacent lines in the block of text. Using the boundary 740 that is farther away is associated with a first mode of operation. Once the user's intention to select text on a different line is made clear by passing over the threshold distance associated with the boundary 740, the computing device makes changing the end point of the selected text easier by reducing the threshold distance to some value less than the original threshold distance. This reduced distance boundary is associated with a second mode of operation.

The second mode is implemented after the initial boundary 740 is traversed and while the drag input is still being input by the user. When the computing device 200 operates in the second mode, each line has a safety zone boundary that is a shorter distance away from the line of text than when the computing device 200 operates in the first mode. For example, the safety zone boundary could have the same reduced distance threshold has boundary 741. FIG. 7C illustrates a bottom boundary 742 associated with the safety zone of the second line of text 720.

Figure 7D:
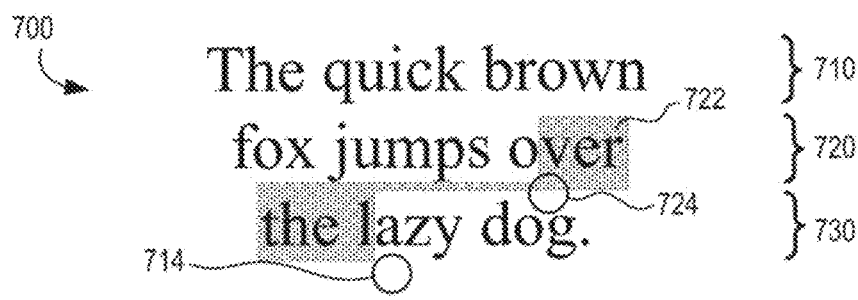

A user may enter a third drag input using the touch screen of computing device 200. FIG. 7C illustrates a path 736 associated with this drag input, which begins at the gripper 714 associated with the beginning of the selected text. As discussed above, while in the first mode, the threshold distance to change lines is relatively far away from the line of text and illustrated by boundary 740. Once the path 736 crosses boundary 740, the computing device enters the second mode, wherein the threshold is reduced and represented by boundary 741. The safety zone boundary of the second mode associated with the second line of text 720 is represented by boundary 742. The path 736 terminates at a location associated with the space between the letter "l" and the letter "a" on the third line 730. As illustrated in FIG. 7D, the gripper 714, which was initially associated with the beginning of the selected text is, after the third drag input, associated with the end of the selected text. Similarly, the gripper 724, which was originally associated with the end of the selected text is, after the third drag input, associated with the beginning of the selected text.

In some embodiments, as drag inputs are received from the user, the highlighting 722 is updated based on the current location along the path associated with each drag input. In some embodiments, the grippers 714 and 724 may not be displayed while the drag input is being received.

The safety zones discussed above do not apply to the direction in which the lines of text are oriented. For example, in the above discussion, safety zones only applied to the direction perpendicular to the lines of text, e.g. the vertical direction. Determining the end points of the highlighted portion of text along the direction of the line of text, e.g. the horizontal direction may be done the same way as described in conjunction with FIGS. 5A-5C. Along this horizontal direction, the highlighted portion of text may be updated one character at a time as the user's drag input passes the characters.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For example, one embodiment disclosed above is directed to approximate and precise placement of a cursor within a string of text. Another embodiment is directed to selection of a string of text using grippers. These embodiments may be combined such that rough and precise placement are used while performing text selection for a gripper. For example, the ending location of a drag input from a user may initially be determined using approximate placement. Then, upon further input from the user, the gripper may be placed more precisely. Any suitable input from the user may be received. For example, the user may provide a tap input within the selected string of text or provide an additional drag input associated with the gripper to precisely place the gripper.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for placing a cursor on a display screen of a computing device displaying a string of characters defining a word, the word having one or more multicharacter portions, each multicharacter portion comprising a plurality of characters, the method comprising:

receiving, from a user, a first input comprising a first input location with respect to the display screen, the first input location being associated with the displayed string of characters;

in response to the first input, determining a cursor placement state based on at least a size of the displayed string of characters on the display screen and from among at least a first state and a second state, wherein the first state provides for approximate placement of the cursor and the second state provides for more precise placement of the cursor than the first state;

in response to the cursor placement state being the first state, selecting, based on at least the first input location, a first cursor location from among a first plurality of placement locations for the word, each of the first plurality of placement locations being adjacent to a beginning character or an end character of one of the one or more multicharacter portions of the word;

in response to the cursor placement state being the second state, selecting, based on at least the first input location, the first cursor location from among a second plurality of placement locations for the word, each of the second plurality of placement locations being adjacent to a character within the word;

in response to selection of the first cursor location, displaying the cursor on the display screen in the first cursor location with respect to the displayed string of characters;

after displaying the cursor in the first cursor location and with the cursor placement state being the second state, receiving, from a user, a second input comprising a second input location with respect to the display screen, the second input location being associated with the displayed string of characters;

in response to receiving the second input with the cursor placement state being the second state, selecting, based on at least the second input location, a second cursor location from among the second plurality of placement locations for the word; and in response to selection of the second cursor location, displaying the cursor on the display screen in the second cursor location with respect to the displayed string of characters, wherein the display screen is a touch screen, and wherein the first input and the second input are generated in response to a user tapping the touch screen;

wherein the first plurality of placement locations for a word comprises fewer locations associated with the word than the second plurality of placement locations for the word.

2. The method of claim 1, wherein:

the first plurality of placement locations comprises a location after the word and a location before the word; and the second plurality of placement locations comprises at least one location between two adjacent characters of at least one multicharacter portion of the word.

3. The method of claim 2, further comprising:

in response to the cursor placement state being the first state and the first input location corresponding to a location within a first half of the word, selecting the first cursor location to be the location before the word; and in response to the cursor placement state being the first state and the first input location corresponding to a location within a second half of the word, selecting the first cursor location to be the location after the word.

4. The method of claim 2, further comprising:

in response to the cursor placement state being the first state and the first input location corresponding to a first predetermined number of characters at a beginning of the word, selecting the first cursor location to be the location before the word; and in response to the cursor placement state being the first state and the first input location being in a second predetermined number of characters at an end of the word, selecting the first cursor location to be the location after the word.

5. The method of claim 4, wherein:

the first plurality of placement locations further comprises an intermediate placement location adjacent to a character of the string of characters that is not in the first predetermined number of characters at the beginning of the string of characters and not in the second predetermined number of characters at the end of the string of characters; and the method further comprises:

in response to the cursor placement state being the first state and the first input location corresponding to a particular intermediate placement location, selecting the first cursor location to be the particular intermediate placement location.

6. The method of claim 2, wherein:

in response to the second input location corresponding to a particular placement location adjacent to a particular character of the word, selecting the second cursor location to be the particular placement location.

7. The method of claim 1, wherein displaying the cursor on the display screen further comprises displaying a gripper below the cursor.

8. The method of claim 1, further comprising, in response to user input in the first state, inserting additional characters in the string at the first cursor location.

9. A computer program product, comprising:

computer storage media;

computer program instructions stored on the computer storage media which, when processed by a processor instructs the processor to perform a process for placing a cursor on a display screen computing displaying a string of characters defining a word, the word having one or more multicharacter portions, each multicharacter portion comprising a plurality of characters, the process comprising:

receiving, from a user, a first input comprising a first input location with respect to the display screen, the first input location being associated with the displayed string of characters;

in response to the first input, determining a cursor placement state based on at least a size of the displayed string of characters on the display screen from among at least a first state and a second state, wherein the first state provides for approximate placement of the cursor and the second state provides for more precise placement of the cursor than the first state;

in response to the cursor placement state being the first state, selecting, based on at least the first input location, a first cursor location from among a first plurality of placement locations for the word, each of the first plurality of placement locations being adjacent to a beginning character or an end character of one of the one or more multicharacter portions of the word;

in response to the cursor placement state being the second state, selecting, based on at least the first input location, the first cursor location from among a second plurality of placement locations for the word, each of the second plurality of placement locations being adjacent to a character within the word;

in response to selection of the first cursor location, displaying the cursor on the display screen in the first cursor location with respect to the displayed string of characters;

after displaying the cursor in the first cursor location and with the cursor placement state being the second state, receiving, from a user, a second input comprising a second input location with respect to the display screen, the second input location being associated with the displayed string of characters;

in response to receiving the second input with the cursor placement state being the second state, selecting, based on at least the second input location, a second cursor location from among the second plurality of placement locations for the word; and in response to selection of the second cursor location, displaying the cursor on the display screen in the second cursor location with respect to the displayed string of characters, wherein the display screen is a touch screen, and wherein the first input and the second input are generated in response to a user tapping the touch screen;

wherein the first plurality of placement locations for a word comprises fewer locations associated with the word than the second plurality of placement locations for the word.

10. The computer program product of claim 9, wherein:

the first plurality of placement locations comprises a location after the word and a location before the word; and the second plurality of placement locations comprises at least one location between two adjacent characters of at least one multicharacter portion of the word.

11. The computer program product of claim 10, wherein the process further comprises:

in response to the cursor placement state being the first state and the first input location corresponding to a location within a first half of the word, selecting the first cursor location to be the location before the word; and in response to the cursor placement state being the first state and the first input location corresponding to a location within a second half of the word, selecting the first cursor location to be the location after the word.

12. The computer program product of claim 10, wherein the process further comprises:
in response to the cursor placement state being the first state and the first input location corresponding to a first predetermined number of characters at a beginning of the word, selecting the first cursor location to be the location before the word; and
in response to the cursor placement state being the first state and the first input location being in a second predetermined number of characters at an end of the word, selecting the first cursor location to be the location after the word.

13. The computer program product of claim 12, wherein:
the first plurality of placement locations further comprises an intermediate placement location adjacent to a character of the string of characters that is not in the first predetermined number of characters at the beginning of the string of characters and not in the second predetermined number of characters at the end of the string of characters; and
the process further comprises:
in response to the cursor placement state being the first state and the first input location corresponding to a particular intermediate placement location, selecting the first cursor location to be the particular intermediate placement location.

14. A computer system, comprising:
at least one processor configured to perform a process for placing a cursor on a display screen displaying a string of characters defining a word, the word having one or more multicharacter portions, each multicharacter portion comprising a plurality of characters, the at least on processor being configured to:
receive, from a user, a first input comprising a first input location with respect to the display screen, the first input location being associated with the displayed string of characters;
in response to the first input, determine a cursor placement state based on at least a size of the displayed string of characters on the display screen and from among at least a first state and a second state, wherein the first state provides for approximate placement of the cursor and the second state provides for more precise placement of the cursor than the first state;
in response to the cursor placement state being the first state, select, based on at least the first input location, a first cursor location from among a first plurality of placement locations for the word, each of the first plurality of placement locations being adjacent to a beginning character or an end character of one of the one or more multicharacter portions of the word;
in response to the cursor placement state being the second state, select, based on at least the first input location, the first cursor location from among a second plurality of placement locations for the word, each of the second plurality of placement locations being adjacent to a character within the word;
in response to selection of the first cursor location, display the cursor on the display screen in the first cursor location with respect to the displayed string of characters;
after displaying the cursor in the first cursor location and with the cursor placement being the second state, receive, from a user, a second input comprising a second input location with respect to the display screen, the second input location being associated with the string of characters;
in response to receiving the second input with the cursor placement state being the second state, select, based on at least the second input location, a second cursor location from among the second plurality of placement locations for the word; and
in response to selection of the second cursor location, display the cursor on the display screen in the second cursor location with respect to the displayed string of characters,
wherein the display screen is a touch screen, and wherein the first input and the second input are generated in response to a user tapping the touch screen;
wherein the first plurality of placement locations for a word comprises fewer locations associated with the word than the second plurality of placement locations for the word.

15. The computer system of claim 14, wherein:
the first plurality of placement locations comprises a location after the word and a location before the word; and
each of the second plurality of placement locations comprises at least one location between two adjacent characters of at least one multicharacter portion of the word.

16. The computer system of claim 15, wherein the processor is further configured to:
in response to the cursor placement state being the first state and the first input location corresponding to a location within a first half of the word, select the first cursor location to be the location before the word; and
in response to the cursor placement state being the first state and the first input location corresponding to a location within a second half of the word, select the first cursor location to be the location after the word.

17. The computer system of claim 15, wherein the processor is further configured to:
in response to the cursor placement state being the first state and the first input location corresponding to a first predetermined number of characters at a beginning of the word, select the first cursor location to be the location before the word; and
in response to the cursor placement state being the first state and the first input location being in a second predetermined number of characters at an end of the word, select the first cursor location to be the location after the word.

18. The computer system of claim 17, wherein:
the first plurality of placement locations further comprises an intermediate placement location adjacent to a character of the string of characters that is not in the first predetermined number of characters at the beginning of the string of characters and not in the second predetermined number of characters at the end of the string of characters; and
the processor is further configured to:
in response to the cursor placement state being the first state and the first input location corresponding to a particular intermediate placement location, select the first cursor location to be the particular intermediate placement location.

19. The computer program product of claim 15, wherein:
in response to the second input location corresponding to a particular placement location adjacent to a particular character of the word, selecting the second cursor location to be the particular placement location.

20. The computer system of claim 10, wherein:
in response to the second input location corresponding to a particular placement location adjacent to a particular character of the word, selecting the second cursor location to be the particular placement location.

* * * * *